United States Patent
Tomimoto et al.

(10) Patent No.: US 8,208,805 B2
(45) Date of Patent: Jun. 26, 2012

(54) IMAGING APPARATUS

(75) Inventors: Honkai Tomimoto, Tokyo (JP); Keita Iwai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/012,722

(22) Filed: Jan. 24, 2011

(65) Prior Publication Data

US 2011/0182568 A1    Jul. 28, 2011

(30) Foreign Application Priority Data

Jan. 26, 2010  (JP) ................................ 2010-014501

(51) Int. Cl.
   *G03B 15/03* (2006.01)

(52) U.S. Cl. .......................... 396/178; 359/700; 359/817

(58) Field of Classification Search .................. 396/178, 396/177; 359/700, 817
   See application file for complete search history.

(56) References Cited

U.S. PATENT DOCUMENTS 5,543,875 A * 8/1996 Machida et al. ................ 396/85
6,611,663 B2 * 8/2003 Nakagawa ...................... 396/62

FOREIGN PATENT DOCUMENTS

JP          07-199295 A     8/1995

* cited by examiner

*Primary Examiner* — Clayton E Laballe
*Assistant Examiner* — Linda B Smith
(74) *Attorney, Agent, or Firm* — Canon USA Inc. IP Division

(57) ABSTRACT

In an imaging apparatus, a first slope is formed that inclines toward a second flash-unit cam at an end face of a first flash-unit cam on the second flash-unit cam side at a first position where a flash-unit follower is located on the first cam when the flash-unit follower is engaged with the first flash-unit cam and the lens barrel unit is changed into wide angle state, and a second slope is formed that inclines toward the first flash-unit cam at an end face of the second cam on the first flash-unit cam side at a second position where the flash-unit follower is located on the second flash-unit cam when the flash-unit follower is engaged with the second flash-unit cam and the lens barrel unit is changed into a wide angle state.

10 Claims, 10 Drawing Sheets

CROSS SECTIONAL VIEW TAKEN ALONG A-A

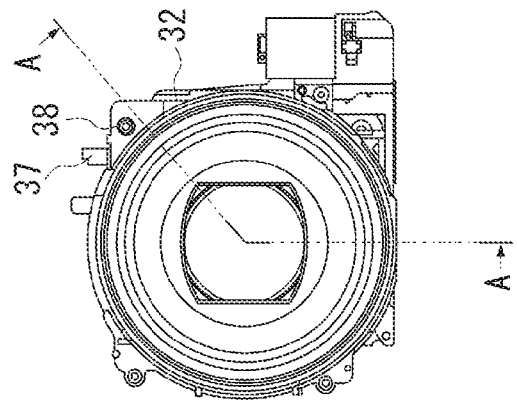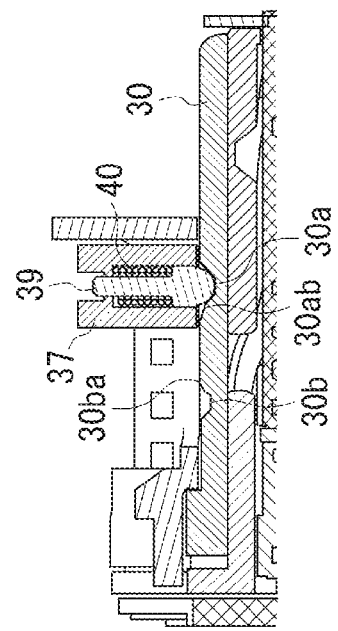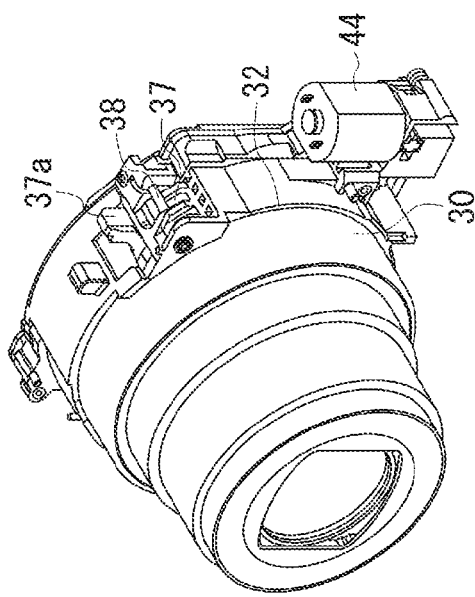

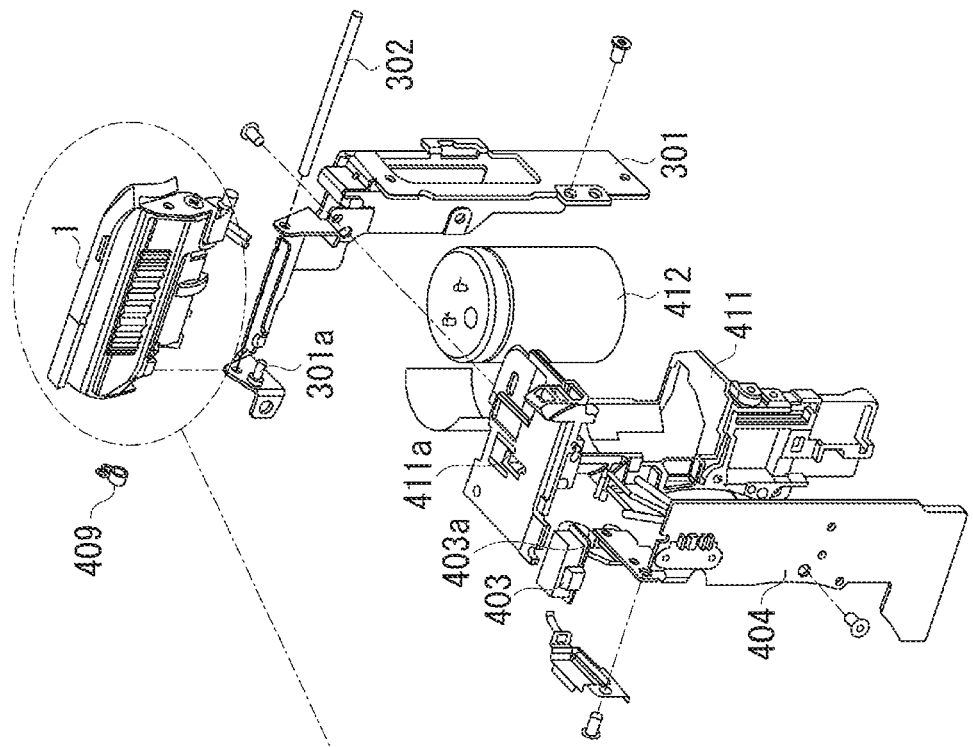
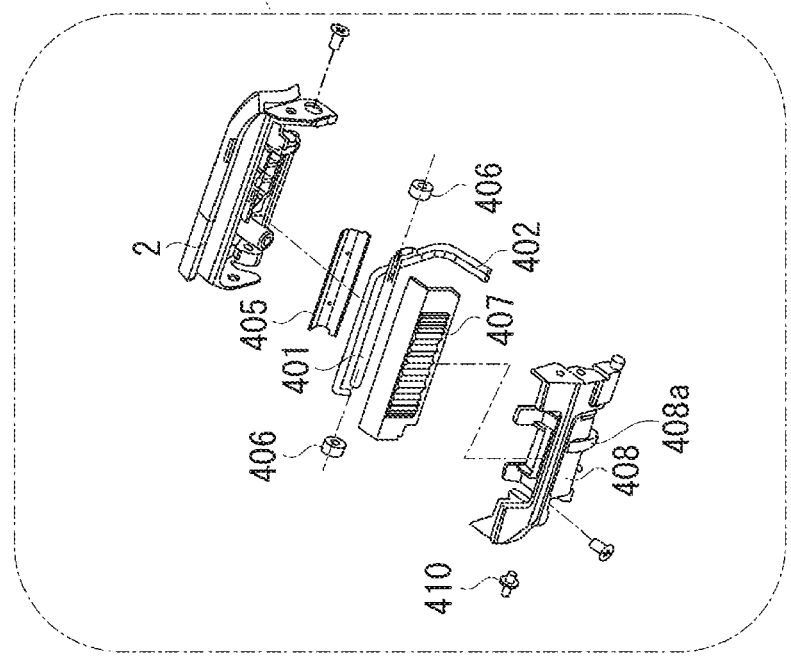
FIG. 4A
FIG. 4B

IMAGING APPARATUS

BACKGROUND OF THE INVENTION

1. Field of the Invention

The present invention relates to an imaging apparatus having a light emitting portion movable between an in-use state and a stored state.

2. Description of the Related Art

Conventionally, in such imaging apparatuses, a light emitting portion is in a stored state when the apparatus is in a non-imaging state with the power turned off, and is in an in-use state at a protruding position when the apparatus is in the imaging state with the power turned on.

Japanese Patent Application No. 07-199295 discusses an imaging apparatus in which a light emitting portion moves between an in-use state and a stored state as a lens barrel extends from its retracted position and returns to the retracted position, respectively.

In the conventional imaging apparatuses, the light emitting portion protrudes and is in the in-use state all the time while the extended lens barrel is in the imaging state, and is in the stored state all the time while the retracted lens barrel is in the non-imaging state.

SUMMARY OF THE INVENTION

According to an aspect of the present invention, An imaging apparatus includes a drive source, a drive member that is driven by the drive source when the imaging apparatus is changed from a non-imaging state to a imaging state and when the imaging apparatus is changed from the imaging state to the non-imaging state, and a light emitting portion movable between an in-use state and a stored state, wherein the drive member has first and second cams engageable with the light emitting portion in such a manner that, when the imaging apparatus is changed from the non-imaging state to the imaging state while the light emitting portion is engaged with the first cam, the drive member is driven by the drive source and the light emitting portion moves from the stored state to the in-use state, and when the imaging apparatus is changed from the imaging state to the non-imaging state while the light emitting portion is engaged with the first cam, the drive member is driven by the drive source and the light emitting portion moves from the in-use state to the stored state, wherein when a user manually moves the light emitting portion from the in-use state to the stored state while the light emitting portion is engaged with the first cam and the light emitting portion is in the in-use state, the light emitting portion is disengaged from the first cam to be engaged with the second cam, wherein a first slope is formed that inclines toward the second cam at an end face of the first cam on the second cam side at a first cam position where the light emitting portion is located on the first cam when the light emitting portion is engaged with the first cam and the imaging apparatus is changed into the imaging state, and wherein a second slope is formed that inclines toward the first cam at an end face of the second cam on the first cam side at a second cam position where the light emitting portion is located on the second cam when the light emitting portion is engaged with the second cam and the imaging apparatus is changed into the imaging state.

The present invention provides an imaging apparatus in which the force required to switch cams to be engaged by a light emitting portion can be reduced, and the cams engaged with the light emitting portion can be switched with a small force.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A to 3C each illustrate the lens barrel unit.

FIGS. 4A and 4B are exploded perspective views each illustrating a light emitting portion.

DESCRIPTION OF THE EMBODIMENTS

Various exemplary embodiments, features, and aspects of the invention will be described in detail below with reference to the drawings.

FIGS. 1A to 1D illustrate four different states of a digital camera as an imaging apparatus according to an exemplary embodiment of the present invention.

Figure 1A:
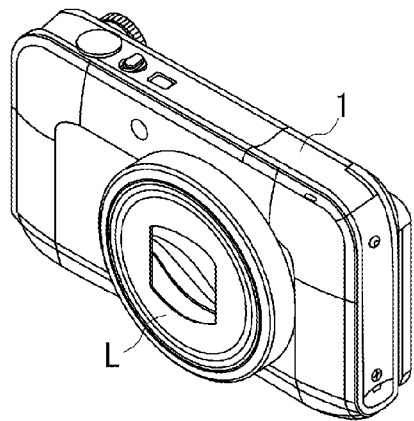
FIGS. 1A to 1D are external perspective views each illustrating a digital camera according to a first exemplary embodiment of the present invention.
Figure 1B:
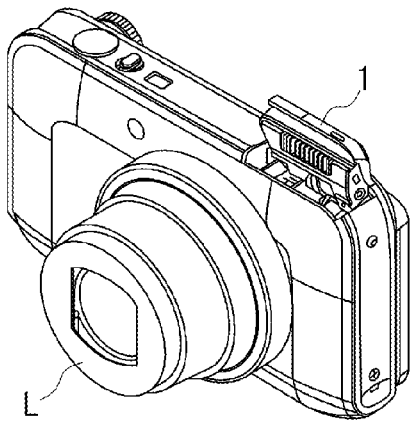

FIG. 1A illustrates a power off state that is one of non-imaging states. In this state, a lens barrel unit L is in stored state, and a light emitting portion 1 is in stored state. FIG. 1B illustrates a power on state that is one of imaging states. In this state, the lens barrel unit L is in extended state, and the light emitting portion 1 is in an in-use state.

Figure 1C:
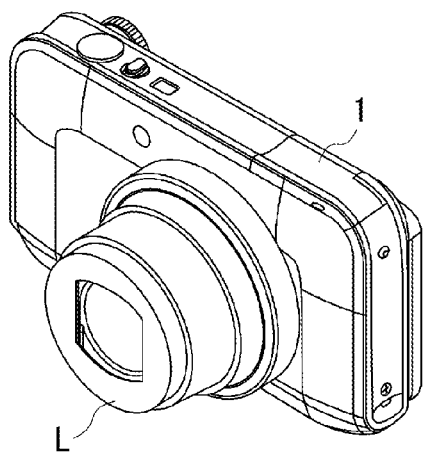
Figure 1D:
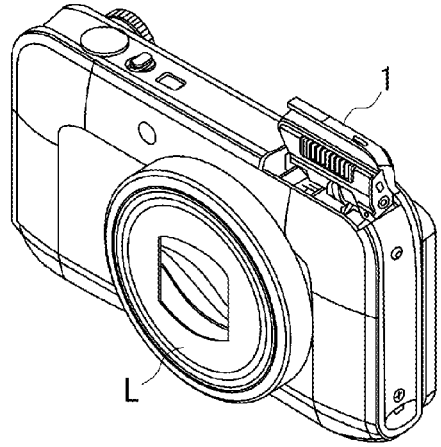

FIG. 1C illustrates a state in which the light emitting portion 1 is manually moved into the stored state from the in-use state illustrated in FIG. 1B. In this state, the lens barrel unit L is in an extended state and the light emitting portion 1 is in the stored state. FIG. 1D illustrates a state in which the light emitting portion 1 is manually moved to the in-use state from the stored state illustrated in FIG. 1A. In this state, the lens barrel unit L is in the stored state, and the light emitting portion 1 is in the in-use state.

The digital camera according to the present exemplary embodiment can be manually brought into the state illustrated in FIG. 1c from the state of FIG. 1B. When power is turned off in the state of FIG. 1C, the digital camera is switched into the state illustrated in FIG. 1A with the light emitting portion 1 being held in the stored state. The digital camera according to the present exemplary embodiment also can be switched from the state of FIG. 1A to that in FIG. 1D. When power is turned on in the state of FIG. 1D, the digital camera is switched into the state illustrated in FIG. 1B, with the light emitting portion 1 being held in the in-use state.

Figure 2:
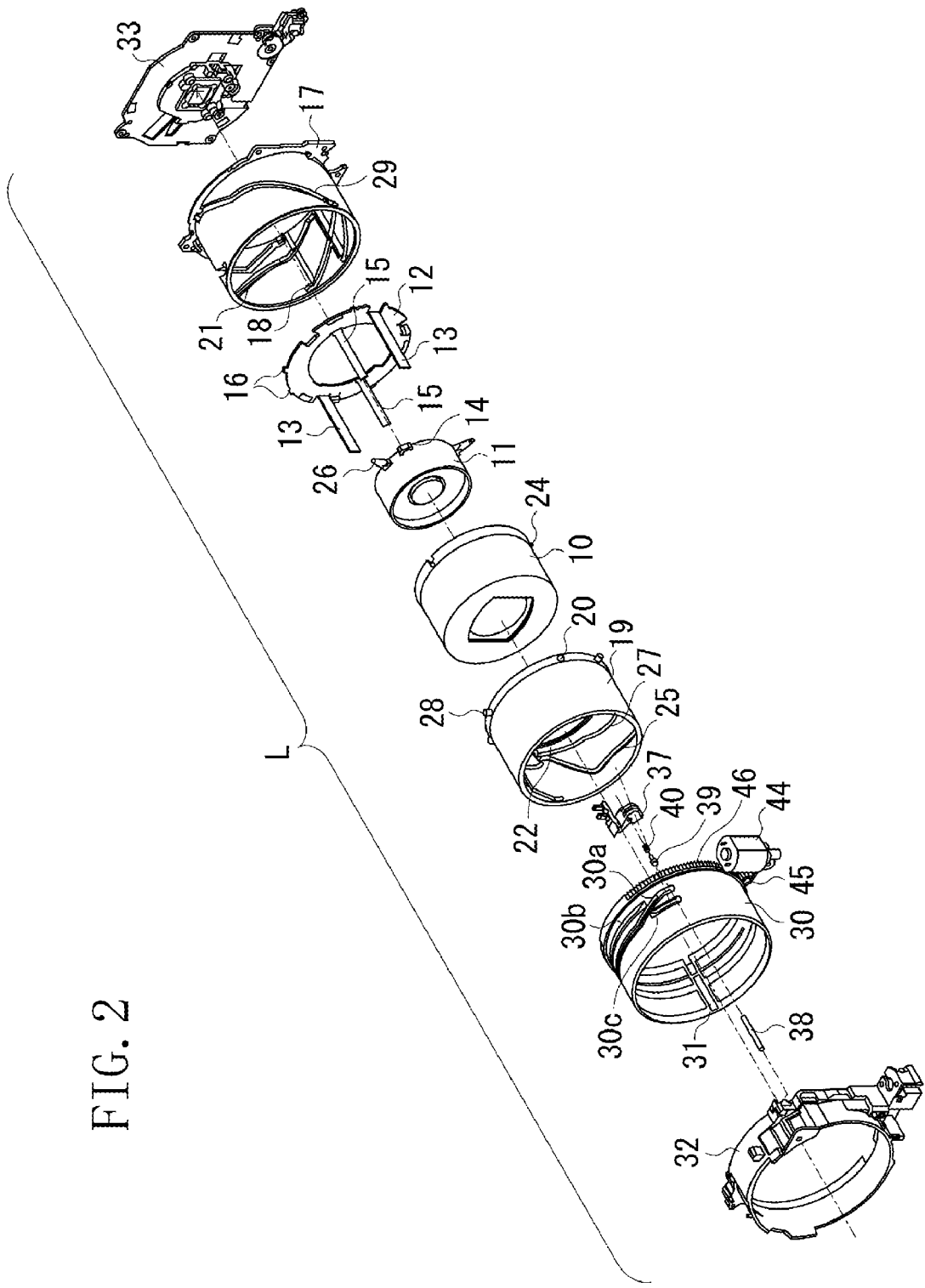
FIG. 2 is an exploded perspective view illustrating a lens barrel unit.

FIG. 2 is an exploded perspective view illustrating a lens barrel unit L of the digital camera.

The lens barrel unit L includes a first lens group, a second lens group, and a third lens group (not illustrated). The first lens group is held by a first-lens-group holder 10, and the second lens group is held by a second-lens-group holder 11. The lens barrel unit L includes a rectilinear motion guide plate 12 having a first-lens-group guide bars 13 to support the first-lens-group holder 10 movable in the direction of the optical axis.

The first-lens-group guide bars 13 are engaged with grooves (not illustrated) formed extending along the optical axis on the inner surface of the first-lens-group holder 10. Similarly, the rectilinear motion guide plate 12 has second-lens-group guide bars 15 integrally formed therewith. The second-lens-group guide bars 15 supports the second-lens-group holder 11 movable in the optical axis direction. The second-lens-group guide bars 15 engage with second-lens-group straight holes 14 provided on the external surface of the second-lens-group holder 11, and support the second-lens-group holder 11 movable in the direction of the optical axis.

Thus, the first and second-lens-group guide bars 13 and 15 formed on the rectilinear motion guide plate 12 respectively guide the first and second lens-group holders 10 and 11 to move in the optical axis direction. The rectilinear motion guide plate 12 further includes a flange having a plurality of projections 16 along the outer edge thereof.

The projections 16 are respectively engaged with the grooves 18 extending in the optical axis direction formed on the inner surface of a stationary cam ring 17, so that the rectilinear motion guide plate 12 is supported to be movable in the optical axis direction.

A moving cam ring 19 has three cam followers 20 at equal intervals along the external surface of the ring 19. The cam followers 20 are respectively engaged with three cams 21 that are formed in the same shape on the inner surface of the stationary cam ring 17. This configuration allows the cam followers 20 to trace the cams 21 respectively as the moving cam ring 19 rotates, and the moving cam ring 19 moves in the optical axis direction in accordance with the rotation.

The moving cam ring 19 further has an engagement groove 22 on the inner surface thereof at the rear end. The rectilinear motion guide plate 12 has a hook 23. The hook 23 is engaged with the groove 22 to rotatably engage the rectilinear motion guide plate 12 to the moving cam ring 19. This allows the rectilinear motion guide plate 12 to move in the optical axis direction as the moving cam ring 19 moves in the optical axis direction.

The first-lens-group holder 10 has first-lens-group cam followers 24 which are positioned so as to divide the outer surface thereof into three at equal. The first-lens-group cam followers 24 are respectively engaged with three first-lens-group cams 25 formed in the same shape on the inner surface of the moving cam ring 19. This configuration allows the first-lens-group cam followers 24 to trace the first-lens-group cams 25 as the moving cam ring 19 rotates.

The first-lens-group holder 10 is guided to move in the optical axis direction, and thereby the first-lens-group holder 10 moves according to the amount of displacement of the first-lens-group cams 25 in the optical axis direction as the moving cam ring 19 rotates.

The second-lens-group holder 11 has a second-lens-group cam followers 26 which are positioned so as to divide the outer surface thereof into three at equal intervals. The second-lens-group cam followers 26 are respectively engaged with three second-lens-group cams 27 formed in the same shape on the inner surface of the moving cam ring 19.

This configuration allows the second-lens-group cam followers 26 to trace the second-lens-group cams 27 as the moving cam ring 19 rotates. The second-lens-group holder 11 is guided to move in the optical axis direction, and thereby the second-lens-group holder 11 moves according to the amount of displacement of the second-lens-group cams 27 in the optical axis direction as the moving cam ring 19 rotates.

The moving cam ring 19 has three drive pins 28 at equal intervals on the external surface thereof. The drive pins 28 each pass through the cam holes 29 to project out from the outer surface of the stationary cam ring 17. The cam holes 29 pass through the stationary cam ring 17 from the inner surface to the outer surfaces thereof. The cams 21 have the same shape as that of the cam holes 29, so that the drive pins 28 trace the cam holes 29 respectively to keep projecting from the cam ring 17 while the moving cam ring 19 rotates and extends from the stationary cam ring 17.

The lens barrel unit L further includes a drive ring 30, which is a drive member to be fit around the stationary cam ring 17 and rotatably supported therearound. The drive ring 30 has three grooves 31 extending in the optical axis direction and positioned at equal intervals on the inner surface thereof, so that the drive pins 28 are engaged in the grooves 31 respectively. This allows the rotation of the drive ring 30 to be transmitted to the moving cam ring 19 via the grooves 31 and the drive pins 28.

As described above, the first-lens-group holder 10, the second-lens-group holder 11, the rectilinear motion guide plate 12, the stationary cam ring 17, the moving cam ring 19, and the drive ring 30 are assembled in a unit and operate in combination. These assembled components are inserted into a lens barrel base 32. An image sensor holder 33 holding an image sensor is fixed in such a manner that the flange of the stationary cam ring 17 is sandwiched between the image sensor holder 33 and the lens barrel base 32.

The lens barrel unit L is driven by a drive source 44 that is an electromagnetic motor converting electric power to mechanical energy. The mechanical energy is transmitted from the drive source 44 via a gear train 45 to a drive ring gear 46 formed on the outer surface of the drive ring 30. In this way, energization of the drive source 44 results in rotation of the drive ring 30.

The lens barrel base 32 holds the drive source 44 and the gear train 45, and also supports a slider 37 to be movable in the optical axis direction as a moving member. The slider 37 is guided by a slider shaft 38 held on the lens barrel base 32, to be movable on the lens barrel base 32 in the optical axis direction.

The slider 37 has a flash-unit follower 39 therein as a follower that is movable forward and backward. The flash-unit follower 39 is biased by a compression spring 40 in the direction so as to project from the slider 37.

The drive ring 30 has, on its outer surface, a first flash-unit cam 30a, a second flash-unit cam 30b, and a third flash-unit cam 30c, each of the cams being engageable with the flash-unit follower 39. When the flash-unit follower 39 engages with the first flash-unit cam 30a, the drive ring 30 rotates to cause the slider 37 to move on the lens barrel base 32 in the optical axis direction.

FIGS. 3A to 3C each illustrate the lens barrel unit L.

FIG. 3A is an external perspective view illustrating the lens barrel unit L. In FIG. 3A, the lens barrel unit L extends to be in wide angle state. FIG. 3B is an external front view illustrating the lens barrel unit L in the state of FIG. 3A. FIG. 3C is a cross sectional view of the lens barrel unit L, taken along the A-A line in FIG. 3B.

As illustrated in FIG. 3A, the slider 37 has a U-shaped portion 37a to cover a projection 408b protruding from a flash-unit holder 408 which will be described later. As illustrated in FIG. 3C, the slider 37 has a hole which is located approximately perpendicular to the outer surface of the drive ring 30 when the slider 37 is held on the slider shaft 38. In the hole, the flash-unit follower 39 and the compression spring 40 are inserted. In FIG. 3C, the flash-unit follower 39 is engaged with the first flash-unit cam 30a.

FIG. 4 is an exploded perspective view illustrating the light emitting portion 1 of a digital camera.

FIG. 4A is an exploded perspective view of the light emitting portion 1. The light emitting portion 1 includes a xenon tube 401 that is electrically connected to a flexible wiring board 403 illustrated in FIG. 4B using a lead 402. The flexible wiring board 403 is electrically connected to a flash-unit substrate 404 that controls light emission.

A reflector 405 collects light emitted from the xenon tube 401. A xenon rubber tubes 406 insulate the xenon tube 401 at both terminals, and bias the xenon tube 401 toward the reflector 405. A prism panel 407 directs the light emitted from the xenon tube 401 and the reflector 405 to a predetermined area.

The xenon tube 401, the reflector 405, the xenon rubber tubes 406, and the prism panel 407 are assembled on a flash-unit holder 408, to which a flash cover 2 is attached with screws to complete assembly of the light emitting portion 1.

FIG. 4B illustrates a configuration for holding the light emitting portion 1 to be movable between the in-use state and the stored state.

The light emitting portion 1 is held by a flash-unit shaft 302 rotatably relative to a flash-unit base 301. The flash-unit holder 408 has a shaft 410 therein to hook one end of a toggle spring 409. The other end of the toggle spring 409 is hooked to a shaft 301a provided in the flash-unit base 301. The toggle spring 409 functions as a bias member around the flash-unit shaft 302, biasing the light emitting portion 1 to be in the in-use state or stored state.

The flexible wiring board 403, the flash-unit substrate 404, and a flash-unit capacitor 412 are mounted onto a mount member 411. The flash-unit base 301 is also mounted on the mount member 411 with screws.

The flexible wiring board 403 is provided with a lever-type detector switch 403a, to detect whether the light emitting portion 1 is in the in-use state or the stored state. The lever-type detector switch 403a is disposed in a hole 411a on the mount member 411 in such a manner that the lever portion protrudes out of the hole 411a.

Accordingly, when the light emitting portion 1 is brought into the stored state, the projection 408a of the flash-unit holder 408 depresses the lever portion of the detector switch 403a. On the other hand, when the light emitting portion 1 is brought into the in-use state, the projection 408a does not contact the lever portion of the detector switch 403a. Only when the detector switch 403a detects that the light emitting portion 1 is in the in-use state, the digital camera controls the light emitting portion 1 to emit light.

Figure 5:
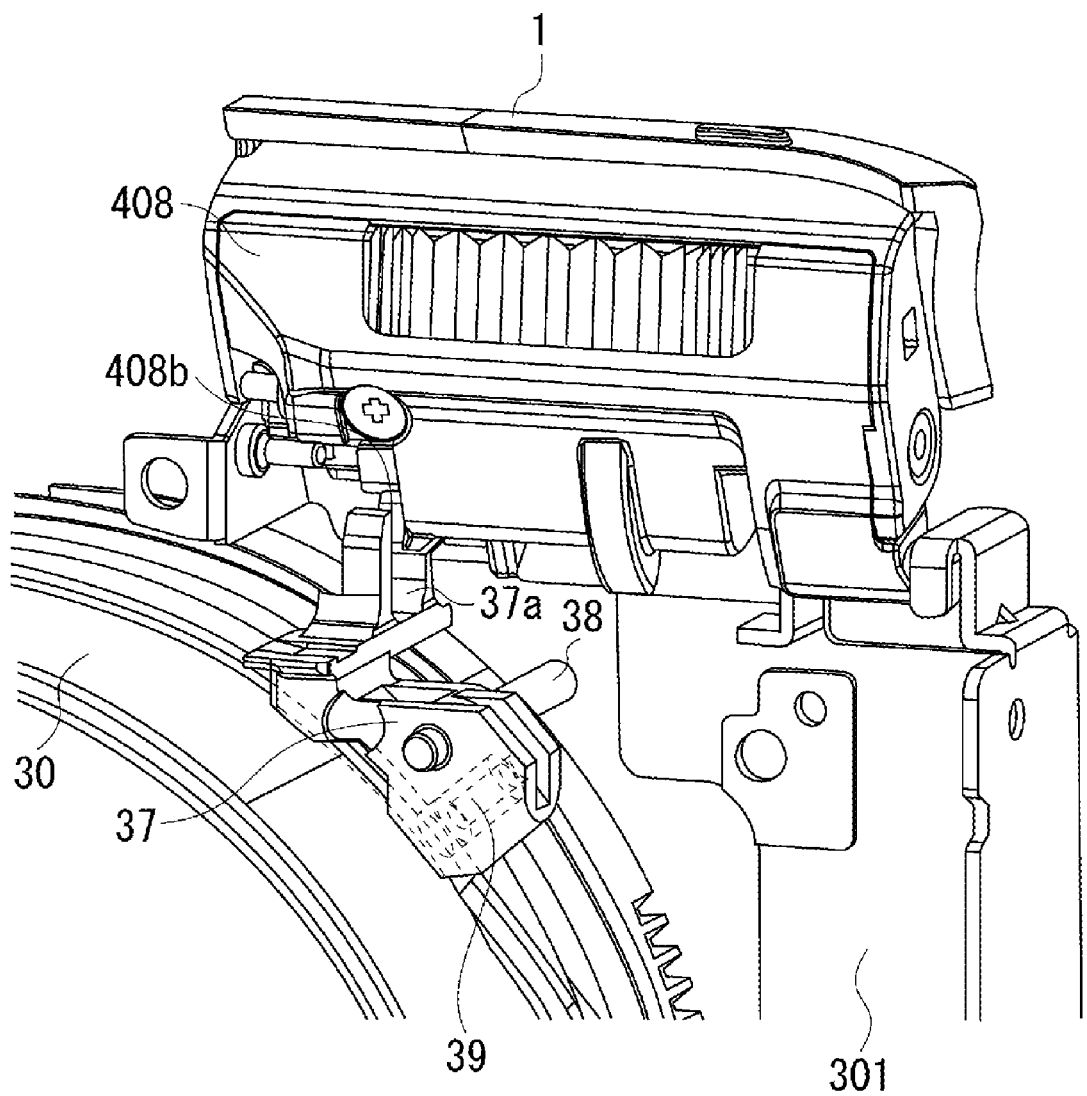
FIG. 5 illustrates a light emitting portion.

FIG. 5 illustrates a light emitting portion of a digital camera according to an exemplary embodiment. In this exemplary embodiment, a light emitting portion 1 and a slider 37 are collectively called a light emitting portion.

FIG. 5 illustrates the light emitting portion without some components such as the lens barrel base 32 and the mount member 411. As described above, rotation of the drive ring 30 causes the flash-unit follower 39 to trace the first flash-unit cam 30a, and the slider 37 to move in the optical axis direction. The light emitting portion 1 is supported rotatably relative to the flash-unit base 301.

As illustrated in FIG. 5, the projection 408b protruding from the flash-unit holder 408 enters the U-shaped portion 37a formed on the slider 37. Accordingly, movement of the slider 37 in the optical axis direction causes the projection 408b to be pushed in by a wall 37a1 or a wall 37a2 of the U-shaped portion 37a, resulting in movement of the light emitting portion 1 between the stored state and the in-use state.

Figure 6A:
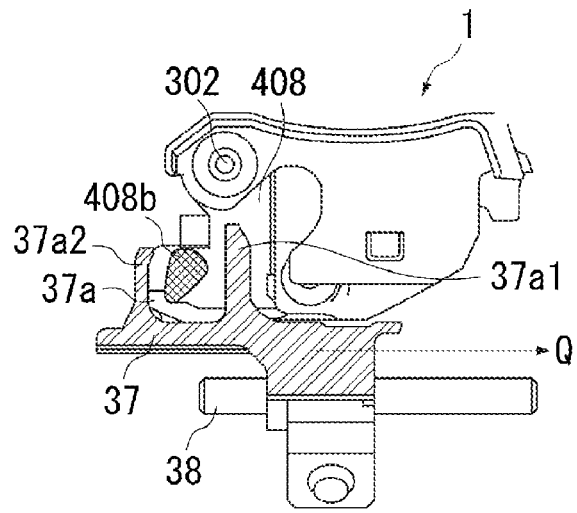
FIGS. 6A to 6C each illustrate movement of the light emitting portion between in-use state and stored state.
Figure 6B:
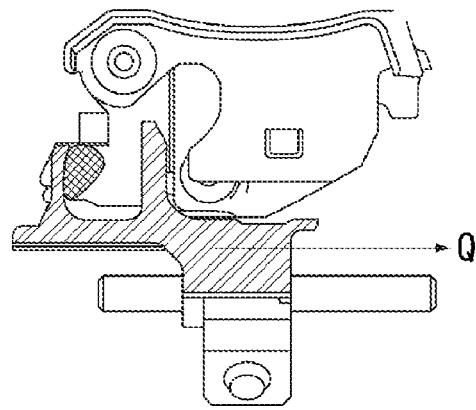
Figure 6C:
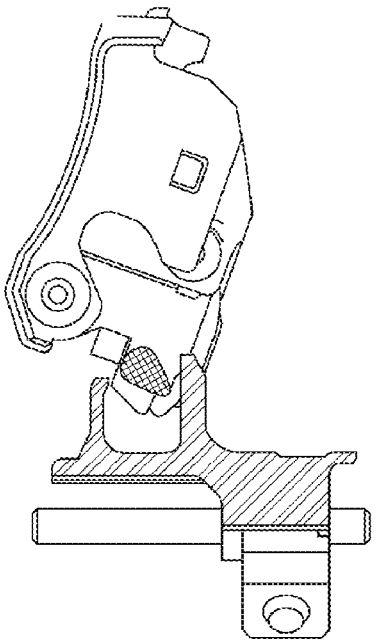

FIGS. 6A to 6C each illustrate movement of the light emitting portion between the in-use state and the stored state.

FIG. 6A illustrates the light emitting portion 1 in the stored state. As illustrated in FIG. 6A, in this state, the projection 408b is not in contact with any wall of the U-shaped portion 37a, and the light emitting portion 1 is biased by the toggle spring 409 toward the stored state position, which maintains the light emitting portion 1 to be in the stored state.

FIG. 6B illustrates the slider 37 that has moved in the direction of the arrow Q from the position in FIG. 6A. In this state, the wall 37a2 of the U-shaped portion 37a contacts the projection 408b, and moves the light emitting portion 1 to the in-use state position against the biasing force of the toggle spring 409.

When the slider 37 causes the light emitting portion 1 to move from the position in FIG. 6B to the position where the direction of the biasing force of the toggle spring 409 is reversed, the light emitting portion 1 is biased toward the in-use state position due to the reversed biasing of the toggle spring 409.

FIG. 6C illustrates the light emitting portion 1 in the in-use state. The projection 408b is not in contact with any wall of the U-shaped portion 37a, and the light emitting portion 1 is biased by the toggle spring 409 toward the in-use state position, which maintains the light emitting portion 1 to be in the in-use state.

As described above, the movement of the slider 37 in the optical axis direction causes the light emitting portion 1 to move from the stored state to the in-use state. The light emitting portion 1 can move from the in-use state to stored state by moving the slider 37 at the position in FIG. 6C to the left side in the FIG. 3.

Figure 7B:
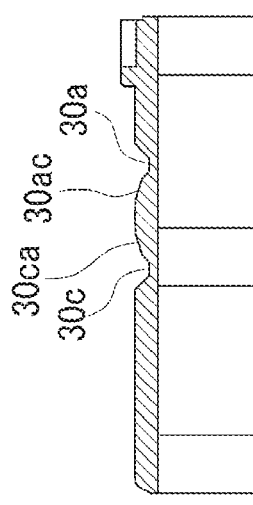
FIGS. 7A to 7C each illustrate three cams in a drive ring 30.
Figure 7A:
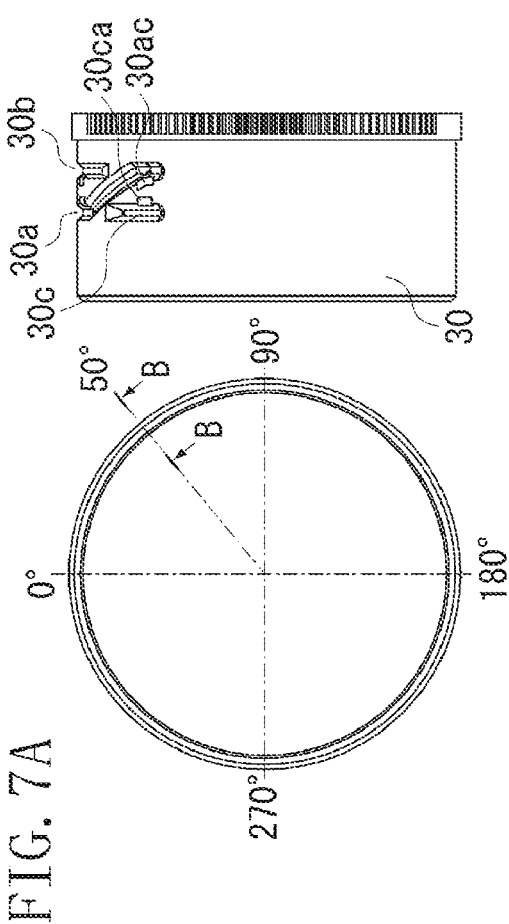
Figure 7C:
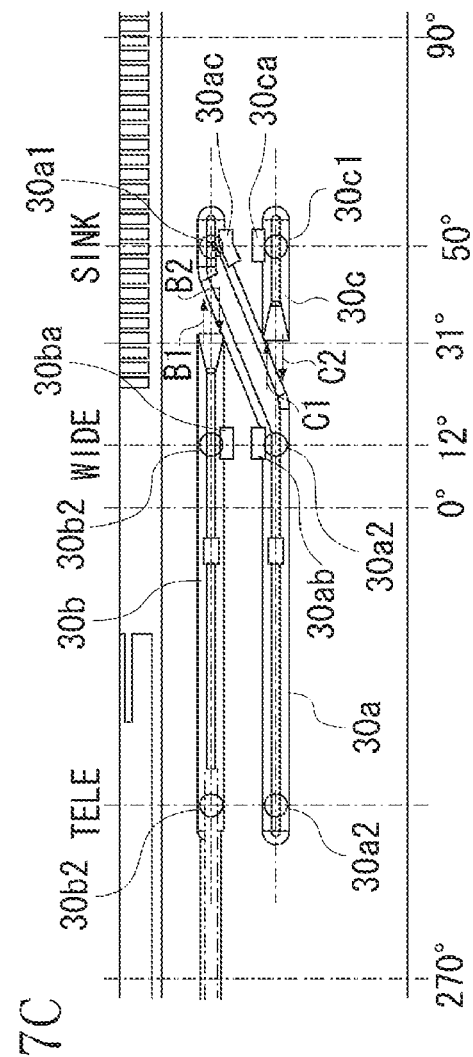

FIGS. 7A to 7C each illustrate three cam shapes formed on the drive ring 30.

FIG. 7A includes a front view and a side view of the drive ring 30. FIG. 7B is a cross sectional view of the drive ring 30, taken along the line B-B in FIG. 7A. FIG. 7C is an enlarged view of a portion in the exploded drive ring 30 where the first flash-unit cam 30a, the second flash-unit cam 30b, and the third flash-unit cam 30c are formed.

FIGS. 8A to 8D each illustrate movement of the light emitting portion.

Figure 8A:
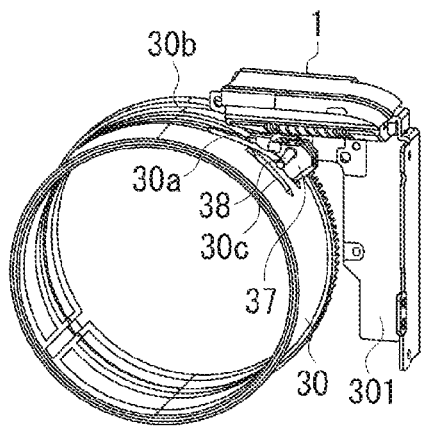
FIGS. 8A to 8D each illustrate movement of the light emitting portion.
Figure 8B:
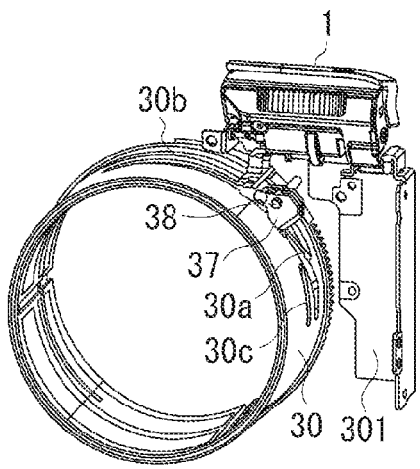
Figure 8C:
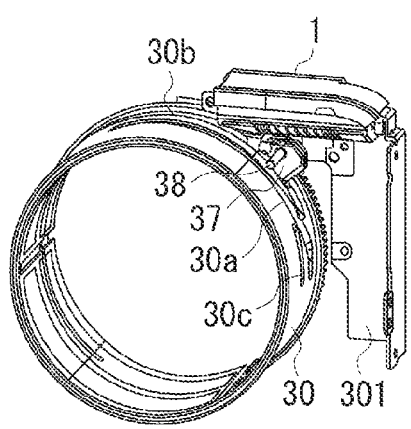
Figure 8D:
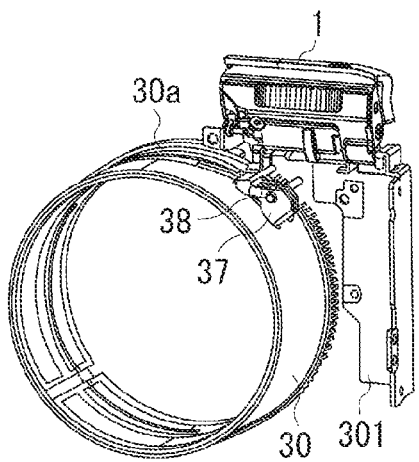

FIG. 8A illustrates a state of the light emitting portion when the digital camera of the present exemplary embodiment is in the state illustrated in FIG. 1A. FIG. 8B illustrates a state of the light emitting portion in the digital camera in the state of FIG. 1B. FIG. 8C illustrates a state of the light emitting portion in the digital camera in the state of FIG. 1C. FIG. 8D illustrates a state of the light emitting portion in the digital camera in the state of FIG. 1D.

As illustrated in FIGS. 7A to 7C, the drive ring 30 has the first flash-unit cam 30a, the second flash-unit cam 30b, and the third flash-unit cam 30c, as first to third cams respectively.

The first flash-unit cam 30a brings the light emitting portion 1 from the stored state to the in-use state when the lens barrel unit L changes from the stored state to the extended state. The first flash-unit cam 30a also brings the light emitting portion 1 from the in-use state to the stored state when the lens barrel unit L changes from the extended state to the stored state.

Accordingly, when the light emitting portion moves between the state illustrated in FIG. 8A and the state in FIG. 8B, the flash-unit follower 39 of the slider 37 traces the first flash-unit cam 30a.

The second flash-unit cam 30b is used, when the lens barrel unit L is in the extended state and the light emitting portion 1 is in the stored state, to bring the lens barrel unit L from the extended state to the stored state while keeping the light emitting portion 1 in the stored state.

The second flash-unit cam 30b is also used, when the lens barrel unit L is changed from the stored state to the extended state, to bring the lens barrel unit L from the stored state to the extended state while keeping the light emitting portion 1 to be in the stored state. Accordingly, when the light emitting portion moves from the state illustrated in FIG. 8C to that in FIG. 8A, the flash-unit follower 39 of the slider 37 traces the second flash-unit cam 30b.

The third flash-unit cam 30c is used, when the lens barrel unit L is in the stored state and the light emitting portion 1 is the in-use state, to bring the lens barrel unit L from the stored state to the extended state while keeping the light emitting portion 1 the in-use state.

The third flash-unit cam 30c is also used, when the lens barrel unit L changes from the extended state to the stored state, to bring the lens barrel unit L from the extended state to the stored state while keeping the light emitting portion 1 in the in-use state. Accordingly, when the light emitting portion moves from the state illustrated in FIG. 8B to that in FIG. 8D, the flash-unit follower 39 of the slider 37 traces the third flash-unit cam 30c.

In FIG. 7C, when the lens barrel unit L in FIG. 8A is in the stored state and the light emitting portion 1 is in the stored state, the flash-unit follower 39 of the slider 37 is located at a position 30a1. When the lens barrel unit L in FIG. 8B extends to a wide angle position and the light emitting portion 1 is in the in-use state, the flash-unit follower 39 of the slider 37 is located at a position 30a2.

When the lens barrel unit L extends to a telephoto position and the light emitting portion 1 is in the in-use state, the flash-unit follower 39 of the slider 37 is located at a position 30a3. The first flash-unit cam 30a moves the light emitting portion 1 between the positions 30a1 and 30a2 between the stored state and the in-use state, with a cam lift set to be substantially zero between the positions 30a1 and 30a2.

As illustrated in FIG. 8B, when the flash-unit follower 39 of the slider 37 is located at the position 30a2, the light emitting portion 1 can be manually brought to the stored state as illustrated in FIG. 8C. At that time, the flash-unit follower 39 is disengaged from the first flash-unit cam 30a, and is engaged with the second flash-unit cam 30b at the position 30b2.

The first flash-unit cam 30a has a first slope 30ab that inclines toward the second flash-unit cam 30b, at an end face of the position 30a2 of the first flash-unit cam 30a on the second flash-unit cam 30b side. In other words, the first slope 30ab is formed, which inclines toward the second cam 30b on the end face of the first cam on the second cam side of the position where the light emitting portion is located on the first cam when the lens barrel unit is in the wide angle position.

The second flash-unit cam 30b has a second slope 30ba that inclines toward the first flash-unit cam 30a, at the end face at position 30b2 of the second flash-unit cam 30b on the first flash-unit cam 30a side. In other words, the second slope 30ba is formed, which inclines toward the first cam at an end face of the second cam on the first cam side at the position where the light emitting portion is located on the second cam when the lens barrel unit is in the wide angle position.

The light emitting portion 1 can be manually brought from the state of FIG. 8B to the stored state as illustrated in FIG. 8C. At this time, the first slope 30ab allows the force required to disengage the flash-unit follower 39 from the first flash-unit cam 30a, to be reduced. In addition, the second slope 30ba allows the flash-unit follower 39 to smoothly engage with the second flash-unit cam 30b.

When the flash-unit follower 39 is located at the position 30a3 and the light emitting portion 1 is manually brought to the stored state, the flash-unit follower 39 is disengaged from the first flash-unit cam 30a. The flash-unit follower 39 is then engaged with the second flash-unit cam 30b at the position 30b3.

In the digital camera according to the present exemplary embodiment, when power is turned on, the lens barrel unit L moves from the stored state position to the wide angle state position. Thus, the first and second slopes 30ab and 30ba are formed on the assumption that the light emitting portion 1 is likely to be manually operated when the lens barrel unit L is brought to the wide angle state.

The present exemplary embodiment does not have a slope at the position 30a3 of the first flash-unit cam 30a and at the position 30b3 of the second flash-unit cam 30b. These positions 30a3 and 30b3, however, can each have a slope. Alternatively, a slope may be formed from the position 30a2 to the position 30a3 of the first flash-unit cam 30a, and another slope from the position 30b2 to the position 30b3 of the second flash-unit cam 30b.

Figure 9A:
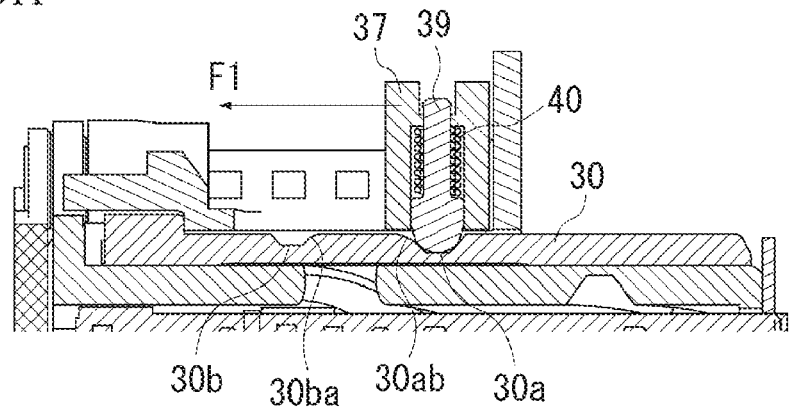
FIGS. 9A to 9C each illustrate movement of the light emitting portion when the light emitting portion is manually operated.
Figure 9B:
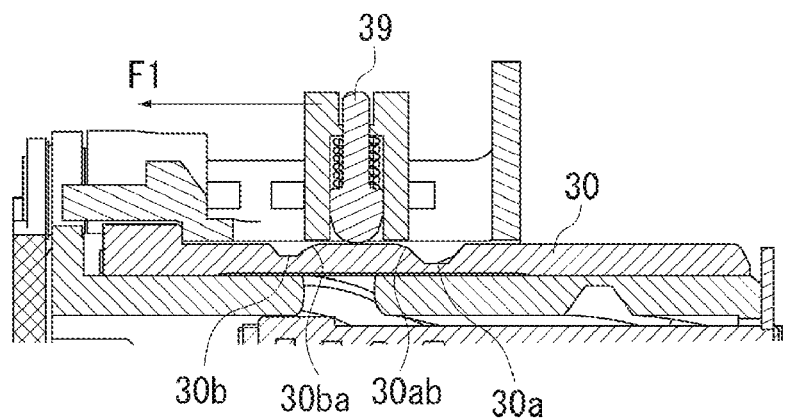
Figure 9C:
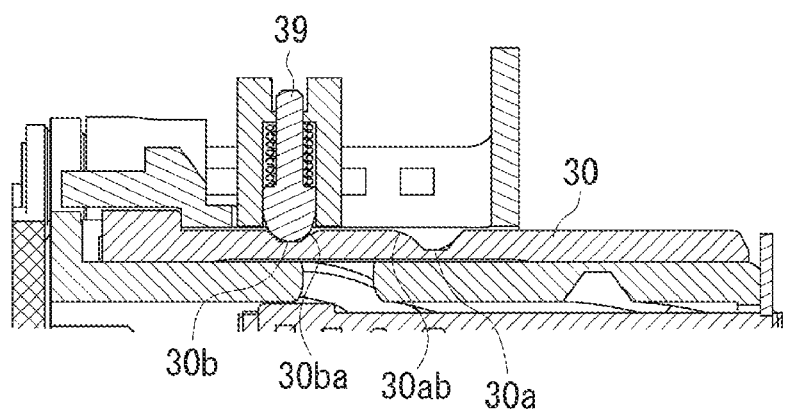

FIGS. 9A to 9C each illustrate movement of the light emitting portion when the unit is manually operated.

FIG. 9A illustrates the flash-unit follower 39 of the slider 37 locating at the position 30a2. In this state, when the light emitting portion 1 is manually retracted, as illustrated in FIG. 9B, a force acts on the slider 37 in the direction of the arrow F1, and the flash-unit follower 39 enters the slider 37 against the biasing force of the compression spring 40.

At that time, the first slope 30ab can decrease the steepness of the portion where the flash-unit follower 39 traces thereof when the slider 37 is moved in the direction of the arrow F1. In other words, a long distance can be used to charge the compression spring 40, which reduces the necessity of a large amount of force in manual operation to disengage the flash-unit follower 39 from the first flash-unit cam 30a.

Thus, the flash-unit follower 39 is disengaged from the first flash-unit cam 30a, and the slider 37 moves in the direction of the arrow F1. Thus, the second slope 30ba at the second flash-unit cams 30b guides the engagement between the flash-unit follower 39 and the second flash-unit cam 30b.

In other words, when the flash-unit follower 39 is brought into contact with the second slope 30ba, the flash-unit follower 39 is inserted into the second flash-unit cam 30b by the biasing force of the compression spring 40.

At the time when the end portion of the flash-unit follower 39 is inserted into the second flash-unit cam 30b, the end portion of the flash-unit follower 39 slides down the second slope 30ba and a slope surface of the second flash-unit cam 30b, imposing a force in the direction of the arrow F1 on the slider 37. Then, as illustrated in FIG. 9c, the flash-unit follower 39 is engaged with the second flash-unit cam 30b.

When the flash-unit follower 39 is engaged with the second flash-unit cam 30b, and the lens barrel unit L moves from the extended state position to the stored state position, the flash-unit follower 39 traces the second flash-unit cam 30b illustrated in FIG. 7C to the right-side end thereof.

Then, the flash-unit follower 39 is disengaged from the second flash-unit cam 30b, and moved in the direction of the arrow B1 in FIG. 7C, to be engaged with the first flash-unit cam 30a and located at the position 30a1.

When the flash-unit follower 39 is positioned at the position 30a1, the lens barrel unit L can be changed from the stored state to the wide angle state with the light emitting portion 1 being held in the stored state. At that time, the flash-unit follower 39 is disengaged from the first flash-unit cam 30a, and moves in the direction of the arrow B2 in FIG. 7C. Then, the flash-unit follower 39 is engaged with the second flash-unit cam 30b to be positioned at the position 30b2.

As illustrated in FIG. 8A, when the flash-unit follower 39 is placed at the position 30a1, the light emitting portion 1 can be is manually changed to the in-use state, to be in the state illustrated in FIG. 8D. At that time, the flash-unit follower 39 is disengaged from the first flash-unit cam 30a, and is engaged with the third flash-unit cam 30c at the position 30c1.

The first flash-unit cam 30a has a third slope 30ac that inclines toward the third flash-unit cam 30c, at the position 30a1 at an end face of the first flash-unit cam 30a on the side of the third flash-unit cam 30c. In other words, the third slope 30ac is formed, which inclines toward the third cam, at an end face of the first cam on the third cam side at the position where the light emitting portion 1 is located on the first cam when the lens barrel unit L is brought into stored state.

Furthermore, the third flash-unit cam 30c has a fourth slope 30ca that inclines toward the first flash-unit cam 30a, at the position 30c1 on the side of the first flash-unit cam 30a at an end face of the third flash-unit cam 30c. In other words, the fourth slope 30ca is formed, which inclines toward the first cam, at an end face of the third cam on the first cam side at the position where the light emitting portion 1 is located on the third cam when the lens barrel unit L is brought into stored state.

The light emitting portion 1, when manually operated to the in-use state, is brought from the state of FIG. 8A to that in FIG. 8D. At that time, the third slope 30ac allows the force required to disengage the flash-unit follower 39 from the first flash-unit cam 30a to be reduced. In addition, the fourth slope 30ca allows the flash-unit follower 39 to be smoothly engaged with the second flash-unit cam 30b.

When the flash-unit follower 39 is located at the position 30c1 and the lens barrel unit L is brought from the stored state to the wide angle state, the flash-unit follower 39 is disengaged from the third flash-unit cam 30c, and moves in the direction of the arrow C1. Then, the flash-unit follower 39 is engaged with the first flash-unit cam 30a to be located at the position 30a2.

When the flash-unit follower 39 is located at the position 30a2, the lens barrel unit L can be changed from the wide angle state to the stored state while the light emitting portion 1 is held in the in-use state. At that time, the flash-unit follower 39 is disengaged from the first flash-unit cam 30a and moves in the direction of the arrow C2 in FIG. 7C. Then, the flash-unit follower 39 is engaged with the third flash-unit cam 30c to be located at the position 30c1.

In the present exemplary embodiment, there is neither coupling between the first flash-unit cam 30a and the second flash-unit cam 30b, nor coupling between the first flash-unit cam 30a and third flash-unit cam 30c. For example, if the first flash-unit cam 30a and the second flash-unit cam 30b are connected, and the flash-unit follower 39 moves from the position 30a1 to the position 30a2, the flash-unit follower 39 would be located at position 30b2.

More specifically, the flash-unit follower 39 does not trace the first flash-unit cam 30a, but traces the second flash-unit cam 30b. To avoid this misleading, in the present exemplary embodiment, the first flash-unit cam 30a is separated from the second flash-unit cam 30b, and the first flash-unit cam 30a is separated from the third flash-unit cam 30c.

As described above, in the digital camera according to the present exemplary embodiment, at the change from a power off state, which is one of the non-imaging states, to a power on state, which is one of the imaging states, the light emitting portion can be brought from the stored state to the in-use state. While in the in-use state with the power on, the light emitting portion can be manually brought from the in-use state to stored state, and the power can be turned off with the light emitting portion being held in stored state.

Furthermore, while the light emitting portion is in the stored state with the power off, the light emitting portion can be manually brought from the stored state to the in-use state, and the power can be turned on with the light emitting portion being held in the in-use state.

As a result, the light emitting portion is linked to the lens barrel unit to move between the in-use state and stored state, however, also can be manually operated to move between the in-use state and the stored state regardless the power on/off state of the digital camera.

In addition, after the light emitting portion is manually moved, the power of the digital camera can be turned on/off without changing the state of the light emitting portion. In other words, when the light emitting portion is manually brought to the stored state while the power is on and then the power is turned off, the light emitting portion moves from the stored state to the in-use state when the power is turned on again.

Similarly, when the light emitting portion is manually brought to the in-use state while the power is off and then the power is turned on, the light emitting portion moves from the in-use state to the stored state when the power is turned off again.

Furthermore, the first slope on the first cam 30a and the second slope on the second cam 30b allows the force required to manually operate the light emitting portion to be reduced while the lens barrel unit is in wide angle state. The third slope on the first cam 30a and the fourth slope on the third cam 30b allow the force required to manually operate the light emitting portion to be reduced while the lens barrel unit is in the stored state.

Figure 10A:
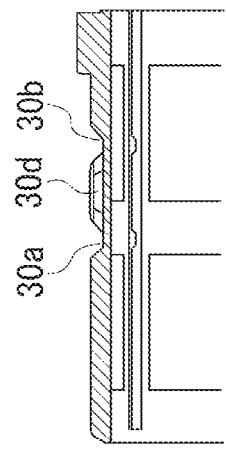
FIGS. 10A to 10C each illustrate a drive ring 30' in a digital camera according to a second exemplary embodiment.
Figure 10B:
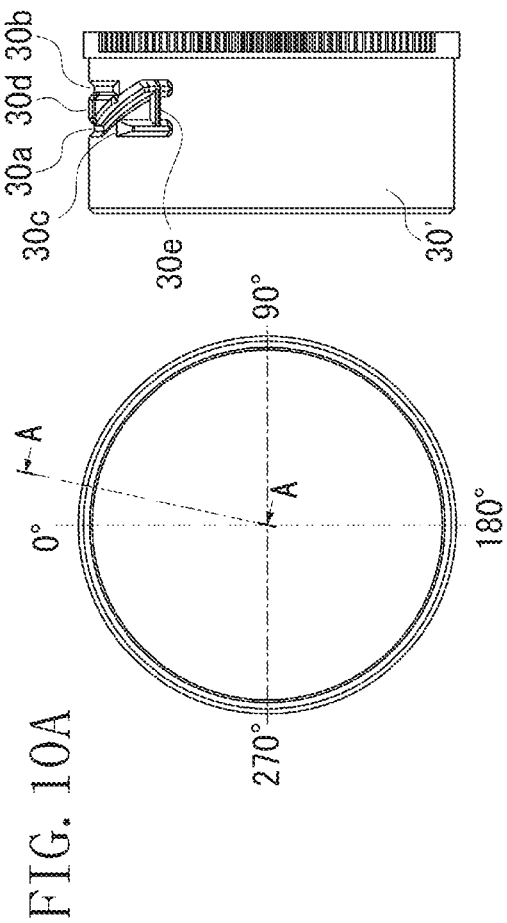
Figure 10C:
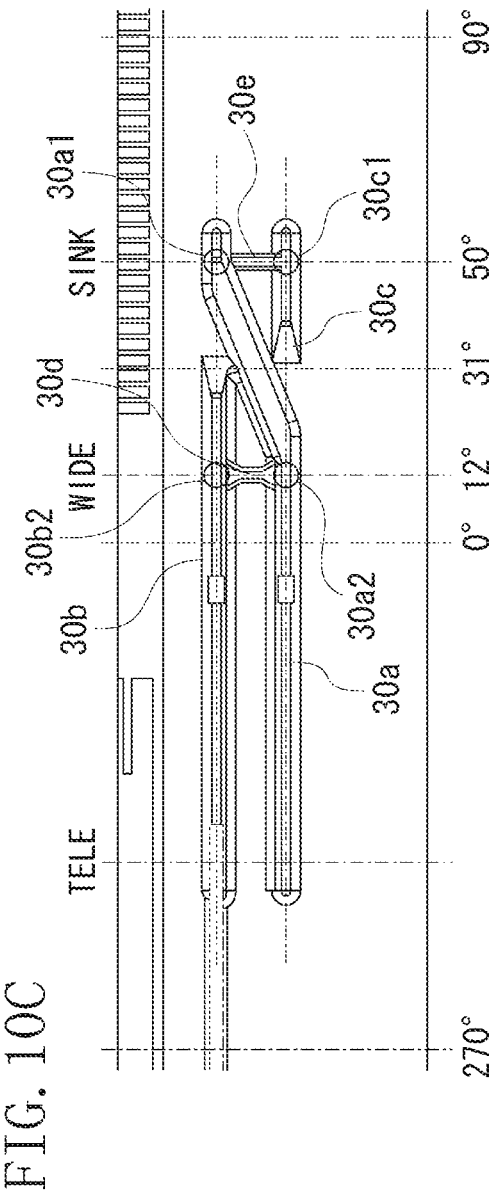

A second exemplary embodiment of the present invention will be described with reference to FIGS. 10A to 10C. The second exemplary embodiment is similar to the first exemplary embodiment except the shape of a drive ring, therefore the same configurations between the exemplary embodiments will not be described below. FIGS. 10A to 10C each illustrate a drive ring 30' in a digital camera according to the second exemplary embodiment.

In the first exemplary embodiment described above, the first to fourth slopes are formed to reduce the force required to manually operate a light emitting portion. On the other hand, in the second exemplary embodiment, as illustrated in FIG. 10A, the drive ring 30' is provided with a first connection cam 30d that connects a position 30a2 of a first flash-unit cam 30a to a position 30b2 of a second flash-unit cam 30b. A second connection cam 30e that connects a position 30a1 of the first flash-unit cam 30a to a position 30c1 of a third flash-unit cam 30c.

The first connection cam 30d is formed perpendicular to the first and second flash-unit cams 30a and 30b. The second connection cam 30e is formed perpendicular to the first and third flash-unit cams 30a and 30c.

Accordingly, when the drive ring 30' is driven to cause a flash-unit follower 39 to trace the first flash-unit cam 30a, the flash-unit follower 39 will not trace the first connection cam 30d or the second connection cam 30e.

Similarly, when the drive ring 30' is driven to cause the flash-unit follower 39 to trace the second flash-unit cam 30b, the flash-unit follower 39 will not trace the first connection cam 30d. When the drive ring 30' is driven to cause the flash-unit follower 39 to trace the third flash-unit cam 30c, the flash-unit follower 39 will not trace the second connection cam 30e.

In the second exemplary embodiment, the first and second connection cams 30d and 30e eliminate the necessity for the flash-unit follower 39 to enter the slider 37. More specifically, when the lens barrel unit L is in the wide angle state, and the light emitting portion 1 is manually moved, the position of the flash-unit follower 39 is switched between the first flash-unit cam 30a and the second flash-unit cam 30b after passing through the first connection cam 30d.

When the lens barrel unit L is in the stored state, and the light emitting portion 1 is manually moved, the position of the flash-unit follower 39 is switched between the first flash-unit cam 30a and the third flash-unit cam 30c after passing through the second connection cam 30e.

Therefore, if the light emitting portion 1 can be manually moved only when the lens barrel unit L is in either stored state or wide angle state, a projection from the slider 37 is enough as the flash-unit follower 39. In this case, however, the light emitting portion 1 can be manually moved only when the lens barrel unit L is extended to the wide angle position.

In the present exemplary embodiment, to allow the manual movement of the light emitting portion 1 when the lens barrel unit L is extended to any other positions other than the wide angle position, the flash-unit follower 39 can retracts to inside of the slider 37. More specifically, the light emitting portion 1 can be manually moved even when the lens barrel unit L is extended to a position other then the wide angle position, however, the movement requires a force more than that for the case with the lens barrel unit L being in the retracted or wide angle position.

In a digital camera of the present exemplary embodiment, the lens barrel unit L can be moved from stored state to the wide angle state when power is turned on. Accordingly, the first and second connection cams 30d and 30e are formed on the assumption that the light emitting portion 1 is likely to be manually moved when the lens barrel unit L is brought to the stored state or the wide angle state.

The positions of the connection cams are not limited to those described above, and the first flash-unit cam 30a and the second flash-unit cam 30b may be connected at a position where the lens barrel unit L is at a telephoto position, for example.

As described above, the digital camera according to the present exemplary embodiment includes the first and second connection cams to reduce the force required to manually operate the light emitting portion while the lens barrel unit is in wide angle state or stored state.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-014501 filed Jan. 26, 2010, which is hereby incorporated by reference herein in its entirety.

What is claimed is:

1. An imaging apparatus comprising:
a drive source;
a drive member that is driven by the drive source when the imaging apparatus is changed from a non-imaging state to an imaging state and when the imaging apparatus is changed from the imaging state to the non-imaging state; and
a light emitting portion movable between an in-use state and a stored state,
wherein the drive member has first and second cams engageable with the light emitting portion in such a manner that, when the imaging apparatus is changed from the non-imaging state to the imaging state while the light emitting portion is engaged with the first cam, the drive member is driven by the drive source and the light emitting portion moves from the stored state to the in-use state, and when the imaging apparatus is changed from the imaging state to the non-imaging state while the light emitting portion is engaged with the first cam, the drive member is driven by the drive source and the light emitting portion moves from the in-use state to the stored state,
wherein when a user manually moves the light emitting portion from the in-use state to the stored state while the light emitting portion is engaged with the first cam and the light emitting portion is in the in-use state, the light emitting portion is disengaged from the first cam to be engaged with the second cam,
wherein a first slope is formed that inclines toward the second cam at an end face of the first cam on the second cam side at a first cam position where the light emitting portion is located on the first cam when the light emitting portion is engaged with the first cam and the imaging apparatus is changed into the imaging state, and
wherein a second slope is formed that inclines toward the first cam at an end face of the second cam on the first cam side at a second cam position where the light emitting portion is located on the second cam when the light emitting portion is engaged with the second cam and the imaging apparatus is changed into the imaging state.

2. The imaging apparatus according to claim 1, wherein when the light emitting portion is engaged with the second cam and the imaging apparatus is changed from the imaging state to the non-imaging state, while the drive member is driven by the drive source, the light emitting portion is held in the stored state.

3. The imaging apparatus according to claim 1, wherein the drive member has a third cam such that, the light emitting portion is disengaged with the first cam and engaged with the third cam in a case where a user manually moves the light emitting portion from the stored state to the in-use state when the light emitting portion is engaged with the first cam and the light emitting portion is brought into the stored state, and
wherein when the light emitting portion is engaged with the third cam and the imaging apparatus is changed from the non-imaging state to the imaging state, while the drive member is driven by the drive source, the light emitting portion is held in the in-use state,
wherein a third slope is formed, which inclines toward the third cam at an end face of the first cam on the third cam side at a third cam position where the light emitting portion is located on the first cam when the light emitting portion is engaged with the first cam and the imaging apparatus is changed into the non-imaging state, and wherein a fourth slope is formed that inclines toward the first cam at an end face of the third cam on the first cam side at a fourth cam position where the light emitting portion is located on the third cam when the light emitting portion is engaged with the third cam and the imaging apparatus is changed into the non-imaging state.

4. The imaging apparatus according to claim 3, wherein when the light emitting portion is engaged with the third cam and the imaging apparatus is changed from the non-imaging state to the imaging state, while the drive member is driven by the drive source, the light emitting portion is held in the in-use state.

5. The imaging apparatus according to claim 1, further comprising a lens barrel movable between stored state and extended state, wherein when the imaging apparatus is changed from the imaging state to the non-imaging state, the drive member drives the lens barrel into the stored state, and when the imaging apparatus is changed from the non-imaging state to the imaging state, the drive member drives the lens barrel into the extended state.

6. An imaging apparatus comprising:

a drive source;

a drive member that is driven by the drive source when the imaging apparatus is changed from a non-imaging state to a imaging state and when the imaging apparatus is changed from the imaging state to the non-imaging state; and a light emitting portion movable between an in-use state and a stored state, wherein the drive member has first and second cams engageable with the light emitting portion in such a manner that, when the light emitting portion is engaged with the first cam and the imaging apparatus is changed from the non-imaging state to the imaging state, the drive member is driven by the drive source and the light emitting portion moves from the stored state to the in-use state, and when the light emitting portion is engaged with the first cam and the imaging apparatus is changed from the imaging state to the non-imaging state, the drive member is driven by the drive source and the light emitting portion moves from the in-use state to the stored state, wherein the light emitting portion is disengaged from the first cam and is engaged with the second cam in a case where a user manually moves the light emitting portion from the in-use state to the stored state when the light emitting portion is engaged with the first cam and the light emitting portion is changed into the in-use state, and wherein the drive member has a connection cam that connects a first cam position where the light emitting portion is located on the first cam when the light emitting portion is engaged with the first cam and the imaging apparatus is changed into the imaging state to a second cam position where the light emitting portion is located on the second cam when the light emitting portion is engaged with the second cam and the imaging apparatus is changed into the imaging state.

7. The imaging apparatus according to claim 6, wherein when the light emitting portion is engaged with the second cam and the imaging apparatus is changed from the imaging state to the non-imaging state, while the drive member is driven by the drive source, the light emitting portion is held in the stored state.

8. The imaging apparatus according to claim 6, wherein the drive member has a third cam such that the light emitting portion is disengaged from the first cam and is engaged with the third cam in a case where a user manually moves the light emitting portion from the stored state to the in-use state when the light emitting portion is engaged with the first cam and the light emitting portion is brought into the stored state, and wherein the drive member has a connection cam that connects a third cam position where the light emitting portion is located on the first cam when the light emitting portion is engaged with the first cam and the imaging apparatus is changed into the non-imaging state to a fourth cam position where the light emitting portion is located on the second cam when the light emitting portion is engaged with the third cam and the imaging apparatus is changed into the non-imaging state.

9. The imaging apparatus according to claim 8, wherein when the light emitting portion is engaged with the third cam and the imaging apparatus is changed from the non-imaging state to the imaging state, while the drive member is driven by the drive source, the light emitting portion is held in the in-use state.

10. The imaging apparatus according to claim 6, further comprising a lens barrel movable between the stored state and the extended state, wherein when the imaging apparatus is changed from the imaging state to the non-imaging state, the drive member brings the lens barrel into the stored state, and when the imaging apparatus is changed from the non-imaging state to the imaging state, the drive member brings the lens barrel into the extended state.

\* \* \* \* \*